US012620153B2

(12) United States Patent
Schaefferkoetter et al.

(10) Patent No.: US 12,620,153 B2
(45) Date of Patent: May 5, 2026

(54) METHODS AND APPARATUS FOR RECONSTRUCTION, ADJUSTMENT AND DISPLAY OF MEDICAL IMAGES BASED ON DISPLACEMENT VECTOR FIELD DATA GENERATED BY A TRAINED MACHINE LEARNING PROCESS

(71) Applicant: Siemens Medical Solutions USA, Inc., Malvern, PA (US)

(72) Inventors: Joshua Schaefferkoetter, Knoxville, TN (US); James Hamill, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 415 days.

(21) Appl. No.: 18/501,500

(22) Filed: Nov. 3, 2023

(65) Prior Publication Data

US 2025/0148661 A1 May 8, 2025

(51) Int. Cl.
*G06T 12/20* (2026.01)
*G06T 12/30* (2026.01)

(52) U.S. Cl.
CPC .............. *G06T 12/20* (2026.01); *G06T 12/30* (2026.01); *G06T 2211/441* (2023.08); *G06T 2211/464* (2023.08)

(58) Field of Classification Search
None
See application file for complete search history.

(56) References Cited

U.S. PATENT DOCUMENTS

2009/0226066 A1* 9/2009 Williams ............... A61B 6/037
378/20
2019/0012811 A1* 1/2019 Wang ..................... A61B 6/032
(Continued)

FOREIGN PATENT DOCUMENTS

CN 109272443 A * 1/2019 .......... G06T 7/0014
CN 110363797 A * 10/2019 ............ G06N 3/045

OTHER PUBLICATIONS

Xiao H. et al., "A review of deep learning-based three-dimensional medical image registration methods", Quant Imaging Med Surg, Dec. 2021;11(12), pp. 4895-4916, doi: 10.21037/qims-21-175. PMID: 34888197; PMCID: PMC8611468.*
(Continued)

*Primary Examiner* — Guillermo M Rivera-Martinez

(57) ABSTRACT

Systems and methods for reconstructing medical images based on motion estimation are disclosed. Measurement data from positron emission tomography (PET) measurement data, and modality measurement data from an anatomy modality, such as computed tomography (CT) data, is received from an image scanning system. A trained deep learning process is applied to the PET measurement data and the modality measurement data to generate displacement vector field (DVF) data characterizing motion between the PET measurement data and the modality measurement data. A modality image is reconstructed from the modality measurement data, and the modality image is adjusted based on the DVF data. A PET image is then reconstructed from the PET measurement data and the adjusted modality image, and the PET image is adjusted based on a computed inverse of the DVF data. The adjusted PET image and the modality image spatially match, and are displayed.

20 Claims, 8 Drawing Sheets

(56)

References Cited

U.S. PATENT DOCUMENTS

| | | | |
|---|---|---|---|
| 2019/0370970 A1* | 12/2019 | Kim | G06T 7/0016 |
| 2022/0180523 A1* | 6/2022 | Novosad | G06T 7/33 |
| 2022/0215599 A1* | 7/2022 | Bharkhada | G01T 1/1663 |
| 2022/0245757 A1* | 8/2022 | Willcut | G06T 7/0012 |
| 2023/0214974 A1* | 7/2023 | Kabus | G06T 5/50 382/131 |
| 2023/0260141 A1* | 8/2023 | Schaefferkoetter | A61B 6/463 382/131 |

OTHER PUBLICATIONS

H. Kang et al., "An Optimized Registration Method Based on Distribution Similarity and DVF Smoothness for 3D PET and CT Images," in IEEE Access, vol. 8, pp. 1135-1145, 2020, doi: 10.1109/ACCESS.2019.2961268.*

Schaefferkoetter et al., "Deep learning for improving PET/CT attenuation correction by elastic registration of anatomical data", Eur J Nucl Med Mol Imaging 50, pp. 2292-2304 (2023), doi: 10.1007/s00259-023-06181-9, AAPA furnished via IDS.*

Mingwei Z. et al., "Generating CT images in delayed PET scans using a multi-resolution registration convolutional neural network", Biomedical Signal Processing and Control, vol. 78, 2022, pp. 1-9, doi: 10.1016/j.bspc.2022.103853.*

Hengjian Y. et al., "Learning 3D non-rigid deformation based on an unsupervised deep learning for PET/CT image registration", Proceedings vol. 10953, Medical Imaging 2019: Biomedical Applications in Molecular, Structural, and Functional Imaging, 2019, pp. 109531X-1-6, doi: 10.1117/12.2512698.*

Schaefferkoetter, Joshua, et al., "Deep Learning for Improving PET/CT Attenuation Correction by Elastic Registration of Anatomical Data," European Journal of Nuclear Medicine and Molecular Imaging, 50, pp. 2292-2304 (2023).

* cited by examiner

200

| Tx/Rx Device | 200 |
| Communication Port(s) | 209 |
| Display | 206 |
| User Interface | 205 |

Data Bus(es) | 208

| Processor(s) | 201 |
| Working Memory | 202 |
| I/O Device(s) | 203 |
| Instruction Memory | 207 |
| Neural Network Engine | 120 |

750
701
752

700
701
702
702

METHODS AND APPARATUS FOR RECONSTRUCTION, ADJUSTMENT AND DISPLAY OF MEDICAL IMAGES BASED ON DISPLACEMENT VECTOR FIELD DATA GENERATED BY A TRAINED MACHINE LEARNING PROCESS

FIELD

Aspects of the present disclosure relate in general to medical diagnostic systems and, more particularly, to reconstructing images from nuclear imaging systems for diagnostic and reporting purposes.

BACKGROUND

Nuclear imaging systems can employ various technologies to capture images. For example, some nuclear imaging systems employ positron emission tomography (PET) to capture images. PET is a nuclear medicine imaging technique that produces tomographic images representing the distribution of positron emitting isotopes within a body. Some nuclear imaging systems employ computed tomography (CT), for example, as a co-modality. CT is an imaging technique that uses x-rays to produce anatomical images. Some nuclear imaging systems combine images from PET and CT scanners during an image fusion process to produce images that show information from both a PET scan and a CT scan (e.g., PET/CT systems). Magnetic Resonance Imaging (MRI) is an imaging technique that uses magnetic fields and radio waves to generate anatomical and functional images.

Typically, these nuclear imaging systems capture measurement data, and process the captured measurement data using mathematical algorithms to reconstruct medical images. For PET/CT systems, the CT measurement information can be used to correct the PET measurement data for attenuation (i.e., attenuation correction of the PET image). Similarly, some nuclear imaging systems combine images from PET and MRI scanners to produce images that show information from both a PET scan and an MRI scan. These conventional models, however, can have several drawbacks. For instance, subjects may move during the PET and CT scans, thereby causing misalignment between the PET and CT measurement data and leading to inaccurate attenuation correction. Moreover, many image formation processes employed by at least some of these systems rely on approximations to compensate for detection loss. The approximations, however, can cause inaccurate and lower quality medical images. As such, there are opportunities to address deficiencies in nuclear imaging systems.

SUMMARY

Systems and methods for inter-modality, elastic registration of images using deep learning-based processes for image alignment are disclosed.

In some embodiments, a computer-implemented method includes receiving positron emission tomography (PET) measurement data from an image scanning system. The method also includes receiving modality measurement data from the image scanning system. Further, the method includes generating displacement vector field (DVF) data based on applying a machine learning process to the PET measurement data and the modality measurement data, wherein the DVF data characterizes offsets between the PET measurement data and the modality measurement data. The method also includes reconstructing a modality image based on the modality measurement data. The method further includes adjusting the modality image based on the DVF data. The method also includes reconstructing a PET image based on the PET measurement data and the adjusted modality image. Further, the method includes adjusting the PET image based on the DVF data. The method also includes providing the PET image for display.

In some embodiments, a non-transitory computer readable medium stores instructions that, when executed by at least one processor, cause the at least one processor to perform operations including receiving PET measurement data from an image scanning system. The operations also include receiving modality measurement data from the image scanning system. Further, the operations include generating DVF data based on applying a machine learning process to the PET measurement data and the modality measurement data, wherein the DVF data characterizes offsets between the PET measurement data and the modality measurement data. The operations also include reconstructing a modality image based on the modality measurement data. The operations further include adjusting the modality image based on the DVF data. The operations also include reconstructing a PET image based on the PET measurement data and the adjusted modality image. Further, the operations include adjusting the PET image based on the DVF data. The operations also include providing the PET image for display.

In some embodiments, a system includes a memory storing instructions, and at least one processor communicatively coupled the memory. The at least one processor is configured to execute the instructions to perform operations. The operations include receiving PET measurement data from an image scanning system. The operations also include receiving modality measurement data from the image scanning system. Further, the operations include generating DVF data based on applying a machine learning process to the PET measurement data and the modality measurement data, wherein the DVF data characterizes offsets between the PET measurement data and the modality measurement data. The operations also include reconstructing a modality image based on the modality measurement data. The operations further include adjusting the modality image based on the DVF data. The operations also include reconstructing a PET image based on the PET measurement data and the adjusted modality image. Further, the operations include adjusting the PET image based on the DVF data. The operations also include providing the PET image for display.

BRIEF DESCRIPTION OF THE DRAWINGS

The following will be apparent from elements of the figures, which are provided for illustrative purposes and are not necessarily drawn to scale.

DETAILED DESCRIPTION

Figure 1:
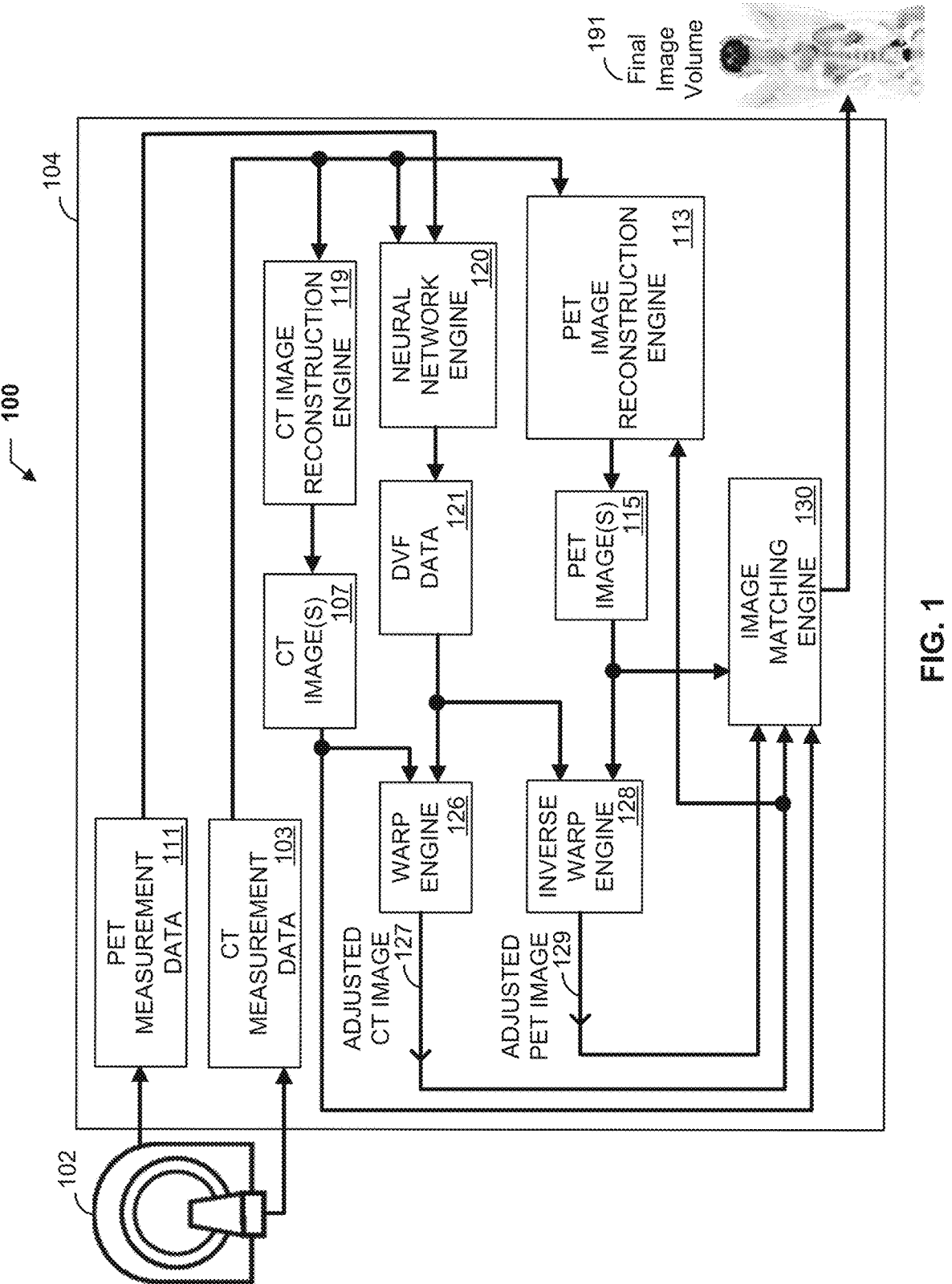
FIG. 1 illustrates a nuclear image reconstruction system, in accordance with some embodiments.

This description of the exemplary embodiments is intended to be read in connection with the accompanying drawings, which are to be considered part of the entire written description. Independent of the grammatical term usage, individuals with male, female, or other gender identities are included within the term.

The exemplary embodiments are described with respect to the claimed systems as well as with respect to the claimed methods. Furthermore, the exemplary embodiments are described with respect to methods and systems for image reconstruction, as well as with respect to methods and systems for training functions used for image reconstruction. Features, advantages, or alternative embodiments herein can be assigned to the other claimed objects and vice versa. For example, claims for the providing systems can be improved with features described or claimed in the context of the methods, and vice versa. In addition, the functional features of described or claimed methods are embodied by objective units of a providing system. Similarly, claims for methods and systems for training image reconstruction functions can be improved with features described or claimed in context of the methods and systems for image reconstruction, and vice versa.

Various embodiments of the present disclosure can employ machine learning methods or processes to provide clinical information from nuclear imaging systems. For example, the embodiments can employ machine learning methods or processes to reconstruct images based on captured measurement data, and provide the reconstructed images for clinical diagnosis. In some embodiments, machine learning methods or processes are trained, to improve the reconstruction of images.

Quantitative PET generally requires an attenuation map (e.g., mu-map) to correct for a number of photons that have either been lost for a sinogram bin (i.e., attenuation correction) or wrongly assigned to another sinogram bin (i.e., scatter correction). The corrections generally depend on an accurate knowledge of photon values within a subject. The attenuation map characterizing the corrections (e.g., mu-map) can be calculated or estimated using an accompanying anatomical modality, such as computed tomography (CT) or magnetic resonance (MR). Subjects, however, may move during image capturing, which can cause problems for the PET reconstruction. For example, motion of the subject between consecutive scans can result in a mu-map, which may be used for attenuation correction, that is spatially mismatched from the captured PET measurement data, and as a result can introduce quantitative artifacts in reconstructed PET images. In addition, because subjects may breathe or voluntarily move portions of their body between consecutive scans, the movement may result in improper image alignment and thus improper attenuation correction of the PET measurement data. Indeed, greater mismatch may be experienced with longer scans. Further, medical professionals, such as a physician, may want to view PET and CT or MR images superimposed on one another. Due to subject movement during the scans, however, the PET and CT or MR images may not be properly aligned to each other, resulting in unaligned images being displayed to the medical professionals.

In some embodiments, machine learning models, such as neural networks, are trained to generate DVF data based on modality measurement data (e.g., CT measurement data or MR measurement data) and PET measurement data. The DVF data may characterize motion between the modality measurement data and the PET measurement data. For instance, the machine learning models may include a first convolutional neural network (CNN), a second CNN, and a third CNN. The first CNN may be trained to generate PET feature data (e.g., PET feature maps) based on PET measurement data. A second CNN may be trained to generate co-modality feature data (e.g., co-modality feature maps) based on co-modality (e.g., CT) measurement data. The third CNN is trained to generate DVF data based on a concatenated set of the PET feature data and the co-modality feature data generated by the first and second CNNs. The generated DVF data may indicate a relative offset (e.g., deformation) between the input pair of feature data (i.e., the PET feature data and the co-modality feature data) due to subject movement during image capture.

With the trained machine learning models, the system (e.g., the PET/MR or PET/CT system) can be employed for clinical imaging. For instance, CT measurement data and PET measurement data may be received for a subject. The CT measurement data and PET measurement data may have been captured during corresponding scans and thus at different times. The embodiments may apply a deep learning process, such as the CNNs described herein, to the CT measurement data and the PET measurement data to generate DVF data. As described herein the DVD data characterizes offsets between corresponding pixels of the CT measurement data and the PET measurement data based on estimated motion. In some examples, the DVF data includes vectors for each pixel of the CT measurement data, where each vector defines a three-dimensional offset from a corresponding pixel location in the PET measurement data (e.g., 3D motion fields). For instance, the DVF data may include vectors characterizing CT-to-PET motions for each pixel of the CT measurement data. Based on the DVF data, the CT measurement data is adjusted. For example, the DVF data may be used to resample the CT measurement data (e.g., CT image volumes), thereby generating warped CT measurement data (e.g., elastically warped CT measurement data) that spatially matches corresponding PET distributions.

Further, the PET measurement data is corrected for attenuation based on the adjusted CT measurement data. As such, a CT image reconstructed from the adjusted CT measurement data may be registered (e.g., matched) to a PET image generated from the attenuation corrected PET measurement data. For example, the reconstructed CT image may be displayed along with (e.g., superimposed with) the PET image generated from the attenuation corrected PET measurement data.

Additionally, the attenuation corrected PET measurement data may be adjusted based on the DVF data to register the attenuation corrected PET measurement data to the original CT measurement data. For example, an inverse of the vectors characterizing CT-to-PET motions (e.g., $DVF^{-1}$) may be computed to generate vectors characterizing PET-to-CT motions. The attenuation corrected PET measurement data may then be adjusted based on the inverse DVF data.

As such, a CT image reconstructed from the original CT measurement data may be matched to the PET image generated from the adjusted attenuation corrected PET measurement data. For example, the reconstructed CT image may be displayed along with (e.g., superimposed with) the PET image generated from the adjusted attenuation corrected PET measurement data.

Among other advantages, the embodiments more accurately match images generated from varying modalities (e.g., PET and MR or PET and CT), such as in cases where a subject moves during scans. In addition, the embodiments may allow for aligning an attenuation corrected PET image to a CT image, and for displaying the attenuation corrected PET image superimposed with the CT image. Further, the embodiments may reduce various types of attenuation correction artifacts in reconstructed PET images of subjects that move during scanning. The embodiments may also reduce associated diagnostic errors, and provide higher quality attenuation and scatter corrections leading to more reliable PET quantification. Persons of ordinary skill in the art may recognize these and other advantages as well.

In some embodiments, a scanning device, such as a PET/CT scanner, provides PET measurement data, such as three-dimensional (3D) time-of-flight sinograms (e.g., measurement data), to a computing device. The PET/CT scanner can also capture CT images, and provide corresponding CT measurement data to the computing device. The computing device can apply a trained machine learning process, such as a trained deep learning neural network, to the PET measurement data (e.g., non-attenuation corrected PET measurement data) and the CT measurement data to generate displacement vector field (DVF) data characterizing detected CT to PET motion fields. For instance, the DVF data may include 3D vectors characterizing CT to PET motions for multiple pixels. In addition, the computing device may adjust the CT measurement data based on the DVF data. For instance, the computing device may adjust pixel positions of the CT measurement data based on the DVF data (e.g., assign CT measurement data pixels from original pixel positions to updated pixel positions based on corresponding motion fields of the DVF data).

Further, the computing device may use the adjusted CT measurement data (e.g., "warped" CT measurement data) to correct for attenuation in the PET measurement data. For example, the computing device may, based on the adjusted CT measurement data, apply an attenuation correction process to the PET measurement data to correct the PET measurements for attenuation. The attenuation correction process may include, for instance, applying one or more algorithms to the adjusted CT measurement data to generate a PET attenuation correction mu-map. In some examples, the computing device also generates an estimate of scattering media based on the adjusted CT measurement data, and applies a PET scatter correction process to the PET measurement data based on the generated estimates to correct for scatter. The computing device may reconstruct a PET image based on the PET attenuation correction mu-map and the PET measurement data. In addition, the computing device may reconstruct an adjusted CT image based on the adjusted CT measurement data. Because of the adjusting, the adjusted CT image may be more spatially aligned (e.g., completely spatially aligned) to the PET image. For instance, portions of the adjusted CT image that pertain to an organ are aligned, or nearly aligned, with portions of the PET image that pertain to the same organ. The computing device may, in some examples, provide the adjusted CT image and the PET image for display.

Further, the computing device may adjust the PET image based on an inverse of the DVF data. For instance, the computing device may generate, based on the DVF data, inverse DVF data (e.g., DVF$^{-1}$) characterizing PET-to-CT motion fields. For instance, the computing device may multiply each DVF vector by −1 to determine a corresponding inverse DVF vector. As an example, assuming a DVF vector that identifies a CT-to-PET motion field of [3, −4, 5], the corresponding inverse DVF vector may identify a PET-to-CT motion field of [−3, 4, −5]. In other examples, such as inversion of a non-rigid DVF vector, the computing device may perform an interpolation of the DVF vectors.

Further, and based on the inverse DVF data, the computing device may adjust each pixel of the PET image to generate an adjusted PET image (e.g., a warped PET image). The adjusted PET image may be more spatially aligned (e.g., spatially aligned) a CT image reconstructed from the CT measurement data. For example, the computing device may reconstruct the CT image from the CT measurement data, and may provide the CT image and the adjusted PET image for display. For instance, the computing device may display one or more of the CT image and the adjusted PET image to a physician for evaluation and diagnosis.

In some examples, the trained machine learning process described herein may include training a machine learning model, such as a deep learning based machine learning model, based on PET and co-modality (e.g., CT) datasets. For instance, as described herein, the machine learning models may include a first CNN, a second CNN, and a third CNN. The first CNN may be trained to generate PET feature data (e.g., PET feature maps) based on PET measurement data. The second CNN may be trained to generate co-modality feature data (e.g., co-modality feature maps) based on co-modality (e.g., CT) measurement data. The third CNN may be trained to generate DVF data based on a concatenated set of PET feature data and co-modality feature data. As described herein, the DVF data may characterize a relative offset (e.g., deformation) between the input pair of feature data.

In some examples, the machine learning models are validated based on additional sets of datasets. For instance, the first CNN and second CNN may be validated based on one or more additional sets of PET and co-modality datasets, respectively. The third CNN may be validated on one or more additional sets of PET feature data and co-modality feature data. During validation, the computing device can determine a loss (e.g., by applying a loss function) between the output of each CNN and an expected output. Training of the CNNs may be complete when the loss (e.g., as indicated by the output of a loss function) has been minimized to at least a threshold (e.g., to below a predetermined threshold).

FIG. 1 illustrates an embodiment of a nuclear imaging system 100. As illustrated, nuclear imaging system 100 includes image scanning system 102 and image reconstruction system 104. Image scanning system 102, in this example, can be a PET/CT scanner that can capture PET and CT images.

Image scanning system 102 can scan a subject to capture CT images, and can generate CT measurement data 103 characterizing the CT scans. Image scanning system 102 can also capture PET images (e.g., of the person), and generate PET measurement data 111 (e.g., PET raw data, such as sinogram data) based on the captured PET images. The PET measurement data 111 can represent anything imaged in the scanner's field-of-view (FOV) containing positron emitting isotopes. For example, the PET measurement data 111 can represent whole-body image scans, such as image scans from a patient's head to thigh. Image scanning system 102 can transmit the CT measurement data 103 and the PET measurement data 111 to image reconstruction system 104.

In some examples, all or parts of image reconstruction system 104 are implemented in hardware, such as in one or more field-programmable gate arrays (FPGAs), one or more application-specific integrated circuits (ASICs), one or more state machines, one or more computing devices, digital circuitry, or any other suitable circuitry. In some examples, parts or all of image reconstruction system 104 can be implemented in software as executable instructions such that, when executed by one or more processors, cause the one or more processors to perform respective functions as described herein. The instructions can be stored in a non-transitory, computer-readable storage medium, for instance.

Figure 2:
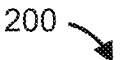
FIG. 2 illustrates a block diagram of an example computing device that can perform one or more of the functions described herein, in accordance with some embodiments.

For example, FIG. 2 illustrates a computing device 200 that can be employed by the image reconstruction system 104. Computing device 200 can implement, for example, one or more of the functions of image reconstruction system 104 described herein.

Computing device 200 can include one or more processors 201, working memory 202, one or more input/output devices 203, instruction memory 207, a transceiver 204, one or more communication ports 209, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like. Processors 201 can be configured to perform a certain function or operation by executing code, stored on instruction memory 207, embodying the function or operation. For example, processors 201 can be configured to perform one or more of any function, method, or operation disclosed herein by executing instructions stored in instruction memory 207.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. For example, instruction memory 207 can store instructions that, when executed by the one or more processors 201, cause one or more processors 201 to perform one or more of the functions of image reconstruction system 104, such as one or more of the neural network engine 120 functions described herein.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of computing device 200. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 207 allows for the programming of executable instructions in instruction memory 207. In some examples, communication port(s) 207 allow for the transfer (e.g., uploading or downloading) of data, such as MRI measurement data 103 and attenuation maps 105.

Display 206 can display user interface 205. User interfaces 205 can enable user interaction with computing device 200. For example, user interface 205 can be a user interface for an application that allows for the viewing of final image volumes 191. In some examples, a user can interact with user interface 205 by engaging input-output devices 203. In some examples, display 206 can be a touchscreen, where user interface 205 is displayed on the touchscreen.

Transceiver 204 allows for communication with a network, such as a Wi-Fi network, an Ethernet network, a cellular network, or any other suitable communication network. For example, if operating in a cellular network, transceiver 204 is configured to allow communications with the cellular network. Processor(s) 201 is operable to receive data from, or send data to, a network via transceiver 204.

Referring back to FIG. 1, image reconstruction system 104 includes neural network engine 120, CT image reconstruction engine 119, PET image reconstruction engine 113, warp engine 126, inverse warp engine 128, and image matching engine 130. As illustrated, CT image reconstruction engine 119 operates on CT measurement data 103 (e.g., CT raw data) to generate reconstructed CT image 107. CT image reconstruction engine 119 can generate reconstructed CT images 107 based on corresponding CT measurement data 103 using any suitable method known in the art.

Further, neural network engine 120 receives PET measurement data 111 and CT measurement data 103, and generates DVF data 121 characterizing CT-to-PET motion (e.g., CT-to-PET motion vectors) based on the PET measurement data 111 and CT measurement data 103. To generate the DVF data 121, neural network engine 120 may apply a deep learning process to the PET measurement data 111 and the CT measurement data 103. For instance, neural network engine 120 may input the PET measurement data 111 to a first trained CNN configured to generate PET feature map data, and may input the CT measurement data 103 to a second trained CNN configured to generate CT feature map data. The PET feature map data may characterize PET features of the PET measurement data 111, and the CT feature map data may characterize features of the CT measurement data 103. The neural network engine 120 may then input the PET feature map data and the CT feature map data to a third trained CNN configured to generate the DVF data 121.

Warp engine 126 receives CT image 107 and DVF data 121, and adjusts CT image 107 based on DVF data 121 to generate adjusted CT image 127. For example, to generate adjusted CT image 127, warp engine 126 may adjust (e.g., update) the pixel position of each pixel of CT image 127 based on a corresponding DVF vector of DVF data 121. Based on the adjustment (e.g., warping), the adjusted CT image 127 may be spatially matched to PET image 115.

Further, PET image reconstruction engine 113 operates on PET measurement data 111 and adjusted CT image 127 to generate reconstructed PET image 115. For instance, PET image reconstruction engine 113 may generate a PET attenuation correction mu-map based on the adjusted CT image 127, and may generate the reconstructed PET image 115 by applying an attenuation correction process to the PET measurement data 111 based on the generated mu-map. For example, the attenuation correction process may include weighting (i.e., applying a weight to) the PET measurement data 111 based on values of the generated mu-map. The attenuation correction process may compensate for PET signal attenuation within the scanned subject.

Inverse warp engine receives the reconstructed PET image 115 and DVF data 121, and adjusts the PET image 115 based on the DVF data 121 to generate adjusted PET image 129. For example, inverse warp engine 128 may determine inverse DVF data (e.g., DVF$^{-1}$) characterizing PET-to-CT motions (e.g., PET-to-CT motion vectors) based on the DVF data 121. To generate adjusted PET image 129, inverse warp engine 128 may adjust (e.g., update) the pixel position of each pixel of PET image 115 based on a corresponding DVF vector of the generated inverse DVF data. Based on the adjustment (e.g., warping), the adjusted PET image 129 may be spatially matched to CT image 107.

Additionally, image matching engine 130 can receive one or more of the PET image 115, CT image 107, adjusted CT image 127, and adjusted PET image 129, and provides one or more of the PET image 115, CT image 107, adjusted CT image 127, and adjusted PET image 129 for display as a final image volume 191. For instance, image matching engine 130 may superimpose one of adjusted CT image 127 and PET image 115 over another, and provide the superimposed images as final image volume 191. Similarly, image matching engine 130 may superimpose one of CT image 107 and adjusted PET image 129 over another, and provide the superimposed images as final image volume 191. In some examples, a medical professional may provide input (e.g., via an I/O device 203) to select which of PET image 115, CT image 107, adjusted CT image 127, and adjusted PET image 129 to provide for display. In addition, image reconstruction system 104 may store one or more of PET image 115, CT image 107, adjusted CT image 127, adjusted PET image 129, and final image volume 191 within a data repository (e.g., working memory 202).

Figure 3:
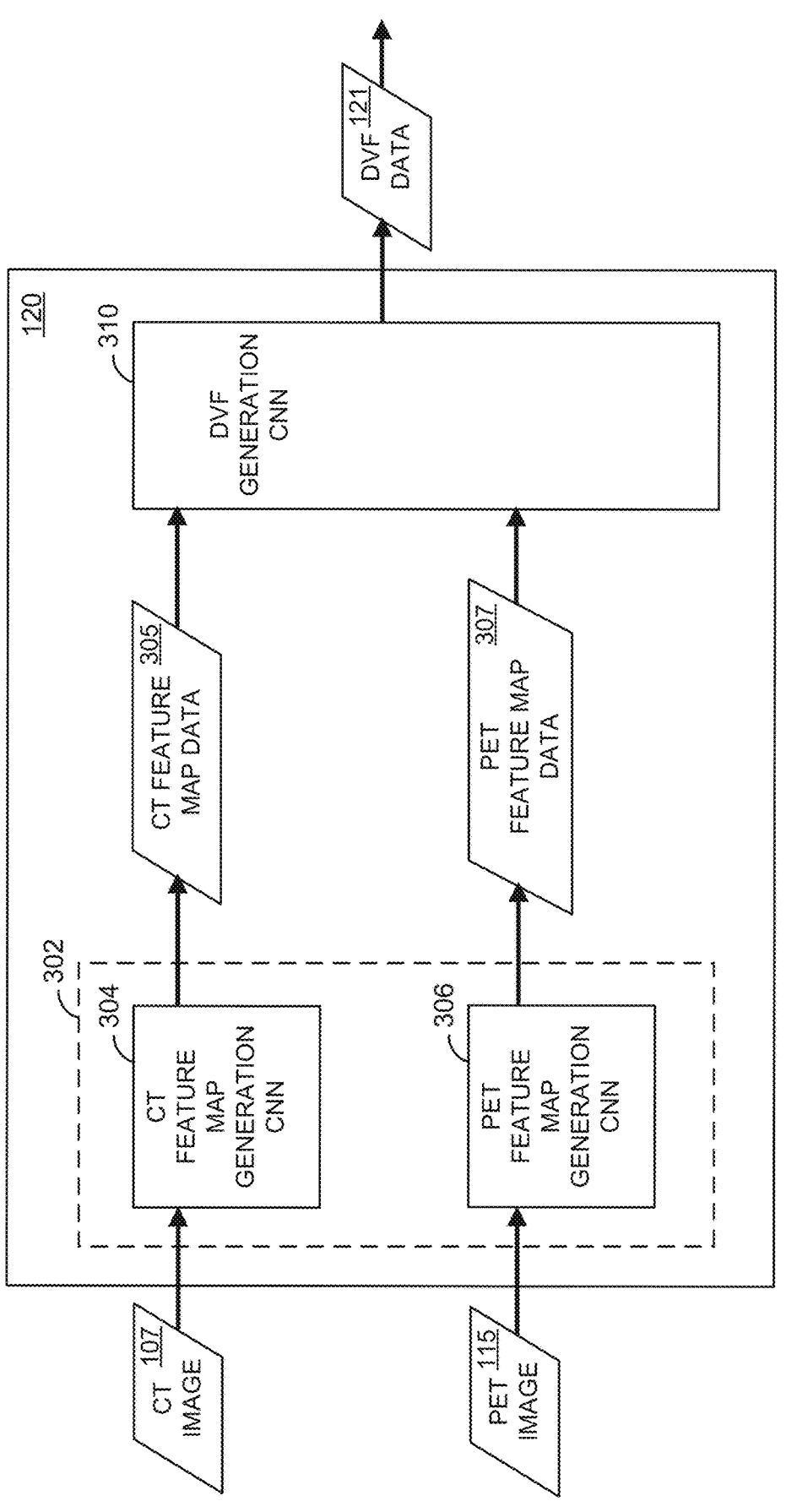
FIG. 3 illustrates a neural network of a nuclear imaging system, in accordance with some embodiments.

FIG. 3 illustrates an example of the neural network engine 120 of FIG. 1. As illustrated, neural network engine 120 includes a trained CT feature map generation CNN 304, a trained PET feature map generation CNN 306, and a trained DVF generation CNN 310. The CT feature map generation CNN 304 is configured to receive as an input a CT image 107, and generate as an output CT feature map data 305 characterizing features of the CT image. As described herein, the CT feature map generation CNN 304 may be trained on CT datasets and, in some examples, validated on further CT datasets. The PET feature map generation CNN 306 is configured to receive as an input a PET image 115, and generate as an output PET feature map data 307 characterizing features of the PET image. As described herein, the PET feature map generation CNN 306 may be trained on PET datasets and, in some examples, may be validated on further PET datasets. In some instances, the CT feature map generation CNN 304 and the PET feature map generation CNN 306 may be implemented as a single CNN 302 that takes as input each of the CT image 107 and the PET image 115, and transforms each of the CT image 107 and the PET image 115 into the CT feature map data 305 and the PET feature map data 307, respectively.

Further, the DVF generation CNN 310 is configured to receive as input the CT feature map data 305 and the PET feature map data 307, and generate as output the DVF data 121. As described herein, the DVF data 121 characterizes motion between the CT image 107 and the PET image 115. The DVF generation CNN 310 may be trained on CT feature map datasets and PET feature MAP datasets and, in some examples, may be validated on further CT feature map datasets and PET feature MAP datasets. Once trained, parameters (e.g., weights, hyperparameters, etc.) characterizing each of the trained CT feature map generation CNN 304, PET feature map generation CNN 306, and DVF generation CNN 310 may be stored in a data repository (e.g., within working memory 202).

Figure 4:
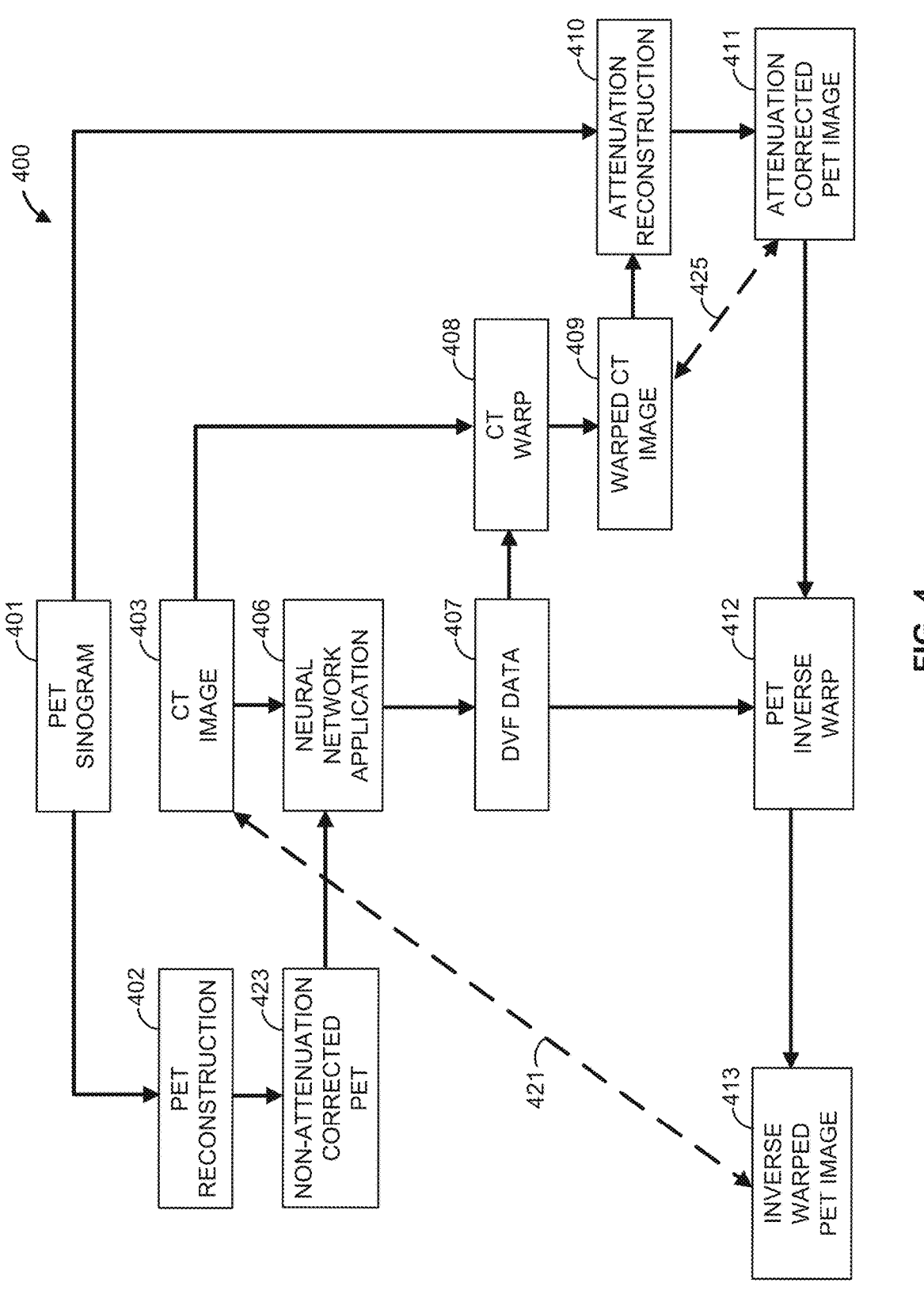
FIG. 4 illustrates functions of a nuclear image reconstruction system, in accordance with some embodiments.

FIG. 4 illustrates functions of a nuclear imaging system, such as the nuclear imaging system 100 of FIG. 1. In this example, a PET sinogram 401 is received for a subject and, at block 402, a PET image is reconstructed to generate a non-attenuation corrected PET 423. Further, a CT image 403 for the subject is also received. At block 406, a deep learning process is applied to the CT image 403 and the non-attenuation corrected PET 423 to generate DVF data 407 characterizing CT-to-PET motion. For example, as described herein, the nuclear imaging system 100 (e.g., via neural network engine 120) may apply a deep learning process to the non-attenuation corrected PET 423 and the CT image 403 to generate the DVF data 407. Applying the deep learning process may include inputting the non-attenuation corrected PET 423 to a first trained CNN (e.g., PET feature map generation CNN 306) configured to generate PET feature map data, and inputting the CT image 403 to a second trained CNN (e.g., CT feature map generation CNN 304) configured to generate CT feature map data. Applying the deep learning process may further include inputting the generated PET feature map data and CT feature map data to a third trained CNN (e.g., DVF generation CNN 310) configured to generate the DVF data 121.

Further, at block 408, the CT image 403 is adjusted (e.g., warped) based on the DVF data 407 to generate a warped CT image 409. For example, and as described herein, a pixel position of each pixel of the CT image 403 may be adjusted according to a corresponding DVF vector of the DVF data 407 to generate the warped CT image 409. At block 410, the PET sinogram 401 is reconstructed based on the warped CT image 409, thereby generating an attenuation corrected PET image 411. For instance, and as described herein, the nuclear imaging system 100 may apply one or more algorithms to the warped CT image 409 to generate a PET attenuation correction mu-map. The nuclear imaging system 100 may generate the attenuation corrected PET image 411 based on the PET attenuation correction mu-map and the PET sinogram 401. As indicated by broken line segment 425, based on the adjustment, the warped CT image 409 is spatially aligned with the attenuation corrected PET image 411.

Additionally, at block 412, the attenuation corrected PET image 411 is adjusted (e.g., inversely warped) based on an the DVF data 407 to generate an inverse warped PET image 413. For instance, as described herein, the nuclear imaging system 100 may compute an inverse of the DVF data 407 (e.g., DVF$^{-1}$), and may adjust a pixel position of each pixel of the attenuation corrected PET image 411 according to a corresponding vector of the inverse of the DVF data 407 to generate an inverse warped PET image 413. As indicated by broken line segment 421, based on the adjustment, the inverse warped PET image 413 is spatially aligned with the CT image 403.

Figure 7B:
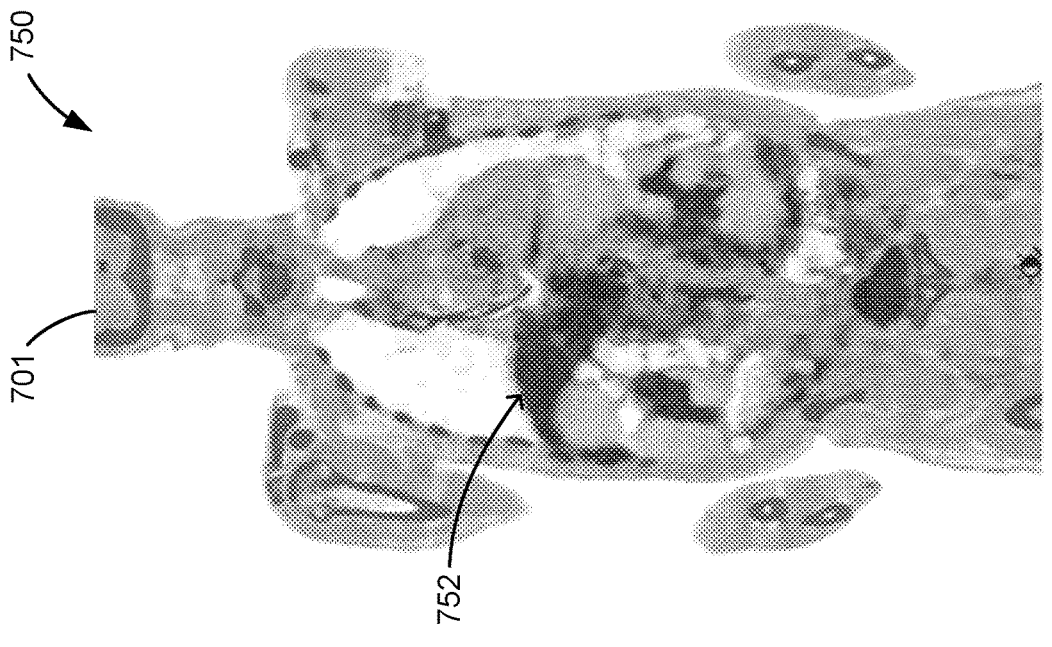
FIG. 7B illustrates aligned nuclear images, in accordance with some embodiments.
Figure 7B:
Figure 7A:
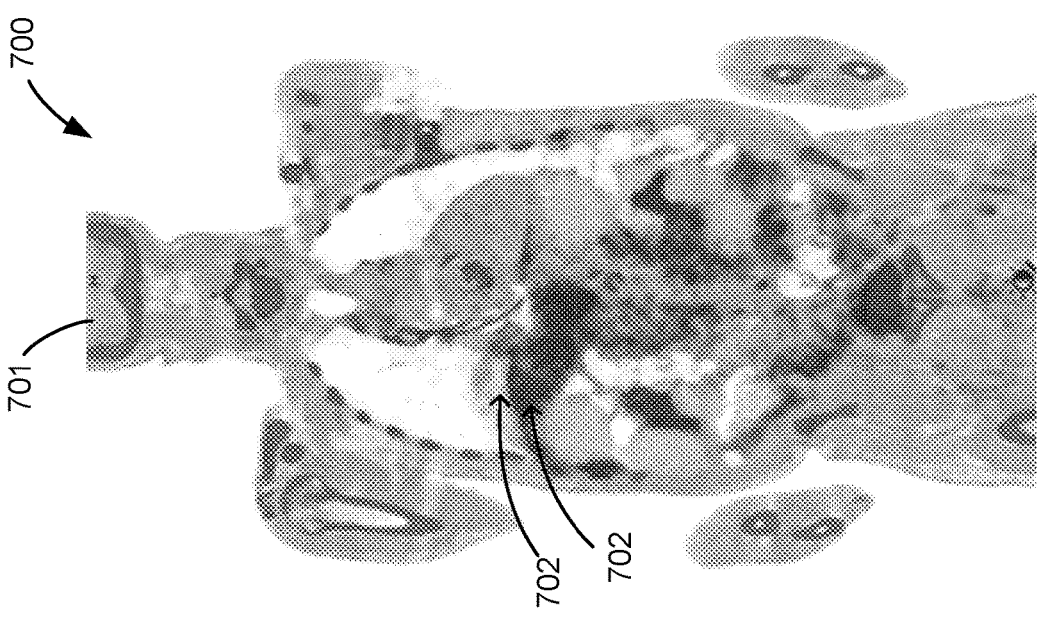
FIG. 7A illustrates misaligned nuclear images.

For example, FIG. 7A illustrates a prior art scan 700 of a subject 701 that includes a CT image and PET image superimposed over each other. As indicated by arrows 702, portions of the scans that correspond to a same organ or portion of an organ are misaligned. FIG. 7B, however, illustrates an aligned scan 750 that includes a CT image (e.g., CT image 403) superimposed with a PET image that has been inversely warped (e.g., inverse warped PET image 413) based on DVF data (e.g., DVF data 407) that has been generated from the CT image and a corresponding PET image. As indicated by arrow 752, the portions of the scans that correspond to the same organ or portion of the organ are more aligned than in FIG. 7A.

Figure 8B:
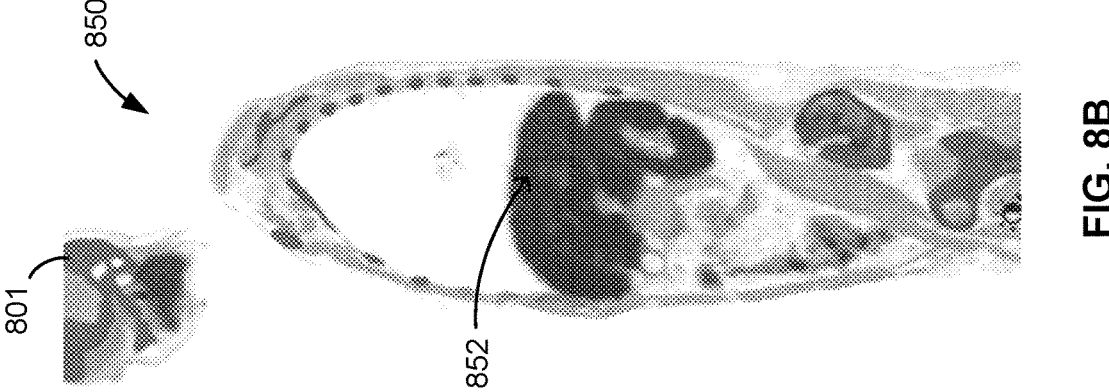
FIG. 8B illustrates aligned nuclear images, in accordance with some embodiments.
Figure 8A:
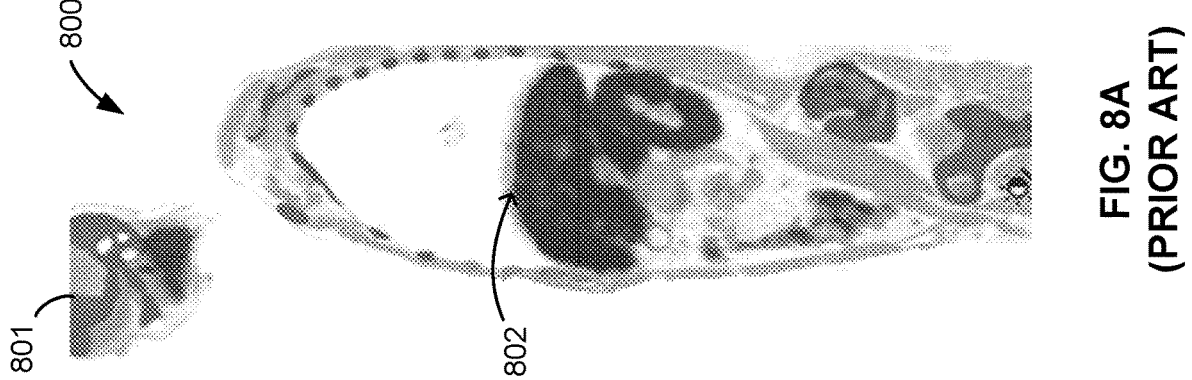
FIG. 8A illustrates misaligned nuclear images.

Similarly, FIG. 8A illustrates a prior art scan 800 of a subject 801 that includes a CT image and PET image superimposed over each other. As indicated by arrow 802, portions of the scans that correspond to a same organ or portion of an organ are misaligned. FIG. 8B, however, illustrates an aligned scan 850 that includes a CT image (e.g., CT image 403) superimposed with a PET image that has been inversely warped (e.g., inverse warped PET image 413) based on DVF data (e.g., DVF data 407) that has been generated from the CT image and a corresponding PET image. As indicated by arrow 852, the portions of the scans that correspond to the same organ or portion of the organ are more aligned than in FIG. 8A.

Figure 5:
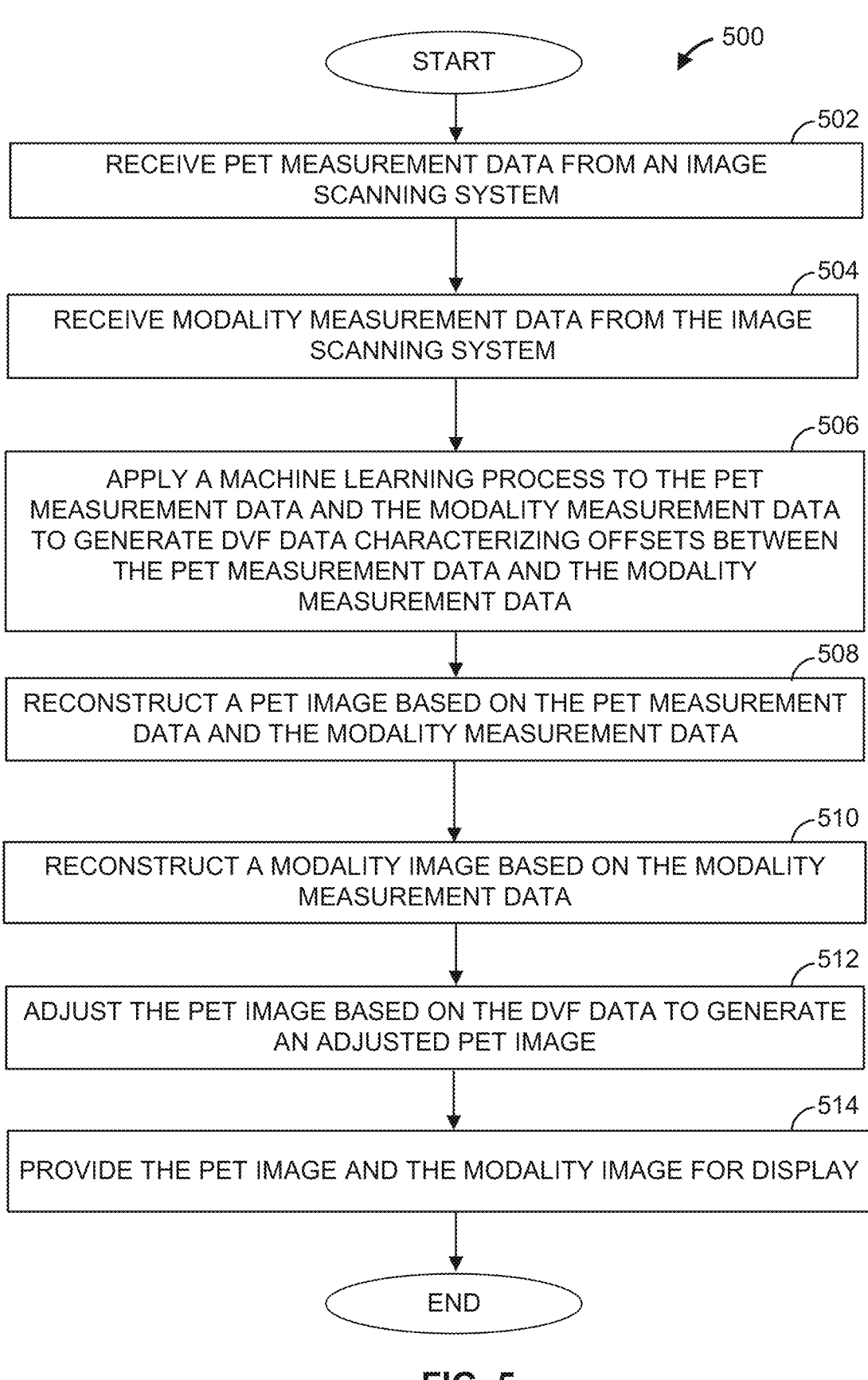
FIG. 5 is a flowchart of an example method to reconstruct an image, in accordance with some embodiments.

FIG. 5 is a flowchart of an example method 500 to reconstruct an image based on estimating motion between a PET image and a co-modality image. The method can be performed by one or more computing devices, such as computing device 200, executing instructions.

Beginning at block 502, PET measurement data is received from an image scanning system. For instance, image reconstruction system 104 may receive PET measurement data 111 from image scanning system 102. At block 504, modality measurement data is received from the image scanning system. The modality measurement data may be CT measurement data, for instance. For example, image reconstruction system 104 may further receive CT measurement data 103 from the image scanning system 102.

Proceeding to block 506, a trained machine learning process (e.g., a trained deep learning process) is applied to the PET measurement data and the modality measurement data to generate DVF data. The DVF data characterizes motion offsets between the PET measurement data and the modality measurement data. For example, as described herein, the image reconstruction system 104 may input the PET measurement data 111 to a first trained CNN configured to generate PET feature map data, and may input the CT measurement data 103 to a second trained CNN configured to generate CT feature map data. The PET feature map data may characterize PET features of the PET measurement data 111, and the CT feature map data may characterize features of the CT measurement data 103. The image reconstruction system 104 may then input the PET feature map data and the CT feature map data to a third trained CNN configured to generate DVF data 121.

Proceeding to block 508, a PET image is reconstructed based on the PET measurement data and the modality measurement data. For example, as described herein, the image reconstruction system 104 may generate a mu-map based on the CT measurement data 103, and reconstruct the PET image 115 based on the PET measurement data 111 and the mu-map. At block 510, a modality image is reconstructed based on the modality measurement data. For example, as described herein, the image reconstruction system 104 reconstructs the CT image 107 based on the CT measurement data 103 received from the image scanning system 102.

Further, at block 512, the PET image is adjusted based on the DVF data to generate an adjusted PET image. For instance, as described herein, the image reconstruction system 104 may determine an inverse of the DVF data 121, and may adjust pixel positions of the PET image 115 based on the inverse DVF data generate the adjusted PET image 129. As described herein, and based on the adjusting, the adjusted PET image may spatially match the CT image.

At block 514, the PET image and the modality image are provided for display. For example, the image reconstruction system 104 may provide the adjusted PET image 129 superimposed with the CT image 107 for display.

Figure 6:
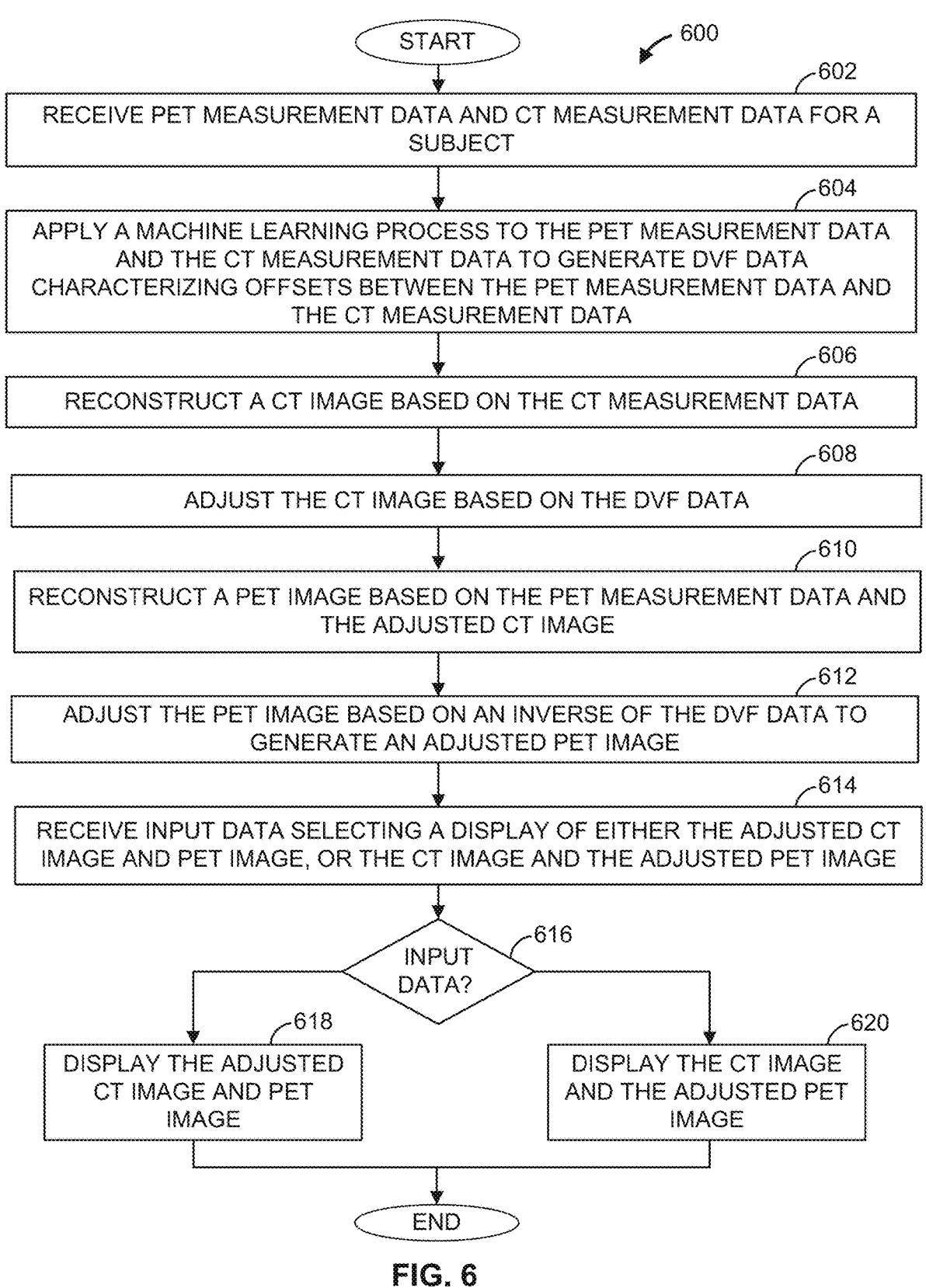
FIG. 6 is a flowchart of another example method to reconstruct an image, in accordance with some embodiments.

FIG. 6 is a flowchart of an example method 600 to reconstruct an image based on estimating motion between a PET image and a CT image. The method can be performed by one or more computing devices, such as computing device 200, executing instructions.

Beginning at block 602, PET measurement data and CT measurement data is received for a subject. For example, as described herein, image reconstruction system 104 may receive PET measurement data 111 and CT measurement data 103 from image scanning system 102. At block 604, a trained machine learning process is applied to the PET measurement data and the CT measurement data to generate DVF data. The DVF data characterizes motion offsets between the PET measurement data and the CT measurement data. For example, as described herein, the image reconstruction system 104 may input the PET measurement data 111 to a first trained CNN configured to generate PET feature map data, and may input the CT measurement data 103 to a second trained CNN configured to generate CT feature map data. The PET feature map data may characterize PET features of the PET measurement data 111, and the CT feature map data may characterize features of the CT measurement data 103. The image reconstruction system 104 may then input the PET feature map data and the CT feature map data to a third trained CNN configured to generate DVF data 121.

Further, at block 606, a CT image is reconstructed based on the CT measurement data. At block 608, the CT image is adjusted based on the DVF data to generate an adjusted CT image. For example, as described herein, the image reconstruction system 104 may adjust CT image 107 based on DVF data 121 to generate an adjusted CT image 127.

At block 610, a PET image is reconstructed based on the PET measurement data and the adjusted CT image. For example, as described herein, the image reconstruction system 104 may generate a mu-map based on the adjusted CT image 127, and may reconstruct the PET image 115 based on the PET measurement data 111 and the mu-map. The adjusted CT image may be spatially aligned to the PET image.

Proceeding to block 612, the PET image is adjusted based on an inverse of the DVF data to generate an adjusted PET image. For example, as described herein, the image reconstruction system 104 may determine an inverse of the DVF data 121, and may adjust pixel positions of the PET image 115 based on the inverse DVF data to generate the adjusted PET image 129. As described herein, and based on the adjusting, the adjusted PET image may spatially match the CT image.

Further, and at block 614, input data is received selecting a display of either the adjusted CT image and PET image, or the CT image and the adjusted PET image. As described herein, the adjusted CT image may be spatially aligned to the PET image, while the adjusted PET image may spatially match the CT image. For example, a medical professional may provide an input via an I/O device 203 that cause the generation of the input data. At block 616, based on the input data, the method either proceeds to block 618 to display the adjusted CT image and PET image, or the method proceeds to block 620 to display the CT image and the adjusted PET image.

The following is a list of non-limiting illustrative embodiments disclosed herein:

Illustrative Embodiment 1: A computer-implemented method comprising:

generating displacement vector field (DVF) data based on applying a trained machine learning process to positron emission tomography (PET) measurement data and modality measurement data, wherein the DVF data characterizes offsets between the PET measurement data and the modality measurement data;

reconstructing a modality image based on the modality measurement data;

adjusting the modality image based on the DVF data;

reconstructing a PET image based on the PET measurement data and the adjusted modality image;

adjusting the PET image based on the DVF data; and providing the adjusted PET image for display.

Illustrative Embodiment 2: The computer-implemented method of illustrative embodiment 1, further comprising:

determining an inverse of the DVF data; and adjusting the PET image based on the inverse of the DVF data Illustrative Embodiment 3: The computer-implemented method of any of illustrative embodiments 1-2, further comprising:

generating an attenuation map based on the adjusted modality image; and reconstructing the PET image based on the attenuation map Illustrative Embodiment 4: The computer-implemented method of any of illustrative embodiments 1-3, wherein adjusting the modality image based on the DVF data comprises resampling the modality image based on the DVF data.

Illustrative Embodiment 5: The computer-implemented method of any of illustrative embodiments 1-4, further comprising:

inputting the PET measurement data to a first convolutional neural network (CNN) of the trained machine learning process to generate first feature data;

inputting the modality measurement data to a second CNN of the trained machine learning process to generate second feature data; and inputting the first feature data and the second feature data to a third CNN of the trained machine learning process to generate the DVF data.

Illustrative Embodiment 6: The computer-implemented method of any of illustrative embodiments 1-5, further comprising:

inputting the PET measurement data to a first convolutional neural network (CNN) of the trained machine learning process to generate first feature data;

inputting the modality measurement data to the first CNN of the trained machine learning process to generate second feature data; and inputting the first feature data and the second feature data to a second CNN of the trained machine learning process to generate the DVF data.

Illustrative Embodiment 7: The computer-implemented method of illustrative embodiment 6, wherein the DVF data characterizes offsets between corresponding features of the first feature data and the second feature data.

Illustrative Embodiment 8: The computer-implemented method of any of illustrative embodiments 1-7, wherein the DVF data comprises a 3-dimensional vector for each of a plurality of pixels of the modality image, the 3-dimensional vectors characterizing motion between the modality image and the PET image.

Illustrative Embodiment 9: The computer-implemented method of any of illustrative embodiments 1-8, further comprising receiving the PET measurement data and the modality measurement data from an image scanning system.

Illustrative Embodiment 10: The computer-implemented method of any of illustrative embodiments 1-9, further comprising providing the modality image superimposed with the adjusted PET image for display.

Illustrative Embodiment 11: The computer-implemented method of any of illustrative embodiments 1-10, further comprising:

training the machine learning process based on a first PET dataset and a first modality data set; and validating the machine learning process based on a second PET dataset and a second modality dataset.

Illustrative Embodiment 12: The computer-implemented method of illustrative embodiment 11, further comprising:

determining a loss between output DVF data of the machine learning process and expected DVF data; and determining the machine learning process is validated when the loss is beyond a threshold.

Illustrative Embodiment 13: The computer-implemented method of any of illustrative embodiments 1-12, wherein the modality measurement data is computed tomography (CT) measurement data.

Illustrative Embodiment 14: A non-transitory, computer readable medium storing instructions that, when executed by at least one processor, cause the at least one processor to perform operations comprising:

generating displacement vector field (DVF) data based on applying a trained machine learning process to positron emission tomography (PET) measurement data and modality measurement data, wherein the DVF data characterizes offsets between the PET measurement data and the modality measurement data;

reconstructing a modality image based on the modality measurement data;

adjusting the modality image based on the DVF data;

reconstructing a PET image based on the PET measurement data and the adjusted modality image;

adjusting the PET image based on the DVF data; and providing the adjusted PET image for display.

Illustrative Embodiment 15: The non-transitory, computer readable medium of illustrative embodiment 14 storing instructions that, when executed by the at least one processor, further cause the at least one processor to perform operations comprising:

determining an inverse of the DVF data; and adjusting the PET image based on the inverse of the DVF data.

Illustrative Embodiment 16: The non-transitory, computer readable medium of any of illustrative embodiments 14-15 storing instructions that, when executed by the at least one processor, further cause the at least one processor to perform operations comprising:

generating an attenuation map based on the adjusted modality image; and reconstructing the PET image based on the attenuation map.

Illustrative Embodiment 17: The non-transitory, computer readable medium of any of illustrative embodiments 14-15 storing instructions that, when executed by the at least one processor, further cause the at least one processor to perform operations comprising:

inputting the PET measurement data to a first convolutional neural network (CNN) of the trained machine learning process to generate first feature data;

inputting the modality measurement data to a second CNN of the trained machine learning process to generate second feature data; and inputting the first feature data and the second feature data to a third CNN of the trained machine learning process to generate the DVF data.

Illustrative Embodiment 18: A system comprising:

a memory storing instructions; and at least one processor communicatively coupled to the memory and configured to execute the instructions to:

generating displacement vector field (DVF) data based on applying a trained machine learning process to positron emission tomography (PET) measurement data and modality measurement data, wherein the DVF data characterizes offsets between the PET measurement data and the modality measurement data;

reconstruct a modality image based on the modality measurement data;

adjust the modality image based on the DVF data;

reconstruct a PET image based on the PET measurement data and the adjusted modality image;

adjust the PET image based on the DVF data; and provide the adjusted PET image for display.

Illustrative Embodiment 19: The system of illustrative embodiment 18, wherein the at least one processor is configured to execute the instructions to:

determine an inverse of the DVF data; and adjust the PET image based on the inverse of the DVF data Illustrative Embodiment 20: The system of any of illustrative embodiments 18-19, wherein the at least one processor is configured to execute the instructions to:

generate an attenuation map based on the adjusted modality image; and reconstruct the PET image based on the attenuation map.

Illustrative Embodiment 21: A system comprising:

a means for generating displacement vector field (DVF) data based on applying a trained machine learning process to positron emission tomography (PET) measurement data and modality measurement data, wherein the DVF data characterizes offsets between the PET measurement data and the modality measurement data;

a means for reconstructing a modality image based on the modality measurement data;

a means for adjusting the modality image based on the DVF data;

a means for reconstructing a PET image based on the PET measurement data and the adjusted modality image;

a means for adjusting the PET image based on the DVF data; and a means for providing the adjusted PET image for display.

Illustrative Embodiment 22: The system of illustrative embodiment 21, further comprising:

a means for determining an inverse of the DVF data; and a means for adjusting the PET image based on the inverse of the DVF data Illustrative Embodiment 23: The system of any of illustrative embodiments 21-22, further comprising:

a means for generating an attenuation map based on the adjusted modality image; and a means for reconstructing the PET image based on the attenuation map Illustrative Embodiment 24: The system of any of illustrative embodiments 21-23, wherein adjusting the modality image based on the DVF data comprises resampling the modality image based on the DVF data.

Illustrative Embodiment 25: The system of any of illustrative embodiments 21-24, further comprising:

a means for inputting the PET measurement data to a first convolutional neural network (CNN) of the trained machine learning process to generate first feature data;

a means for inputting the modality measurement data to a second CNN of the trained machine learning process to generate second feature data; and a means for inputting the first feature data and the second feature data to a third CNN of the trained machine learning process to generate the DVF data.

Illustrative Embodiment 26: The system of any of illustrative embodiments 21-25, further comprising:

a means for inputting the PET measurement data to a first convolutional neural network (CNN) of the trained machine learning process to generate first feature data;

a means for inputting the modality measurement data to the first CNN of the trained machine learning process to generate second feature data; and a means for inputting the first feature data and the second feature data to a second CNN of the trained machine learning process to generate the DVF data.

Illustrative Embodiment 27: The system of illustrative embodiment 26, wherein the DVF data characterizes offsets between corresponding features of the first feature data and the second feature data.

Illustrative Embodiment 28: The system of any of illustrative embodiments 21-27, wherein the DVF data comprises a 3-dimensional vector for each of a plurality of pixels of the modality image, the 3-dimensional vectors characterizing motion between the modality image and the PET image.

Illustrative Embodiment 29: The system of any of illustrative embodiments 21-28, further comprising a means for receiving the PET measurement data and the modality measurement data from an image scanning system.

Illustrative Embodiment 30: The system of any of illustrative embodiments 21-29, further comprising a means for providing the modality image superimposed with the adjusted PET image for display.

Illustrative Embodiment 31: The system of any of illustrative embodiments 21-30, further comprising:

a means for training the machine learning process based on a first PET dataset and a first modality data set; and a means for validating the machine learning process based on a second PET dataset and a second modality dataset.

Illustrative Embodiment 32: The system of illustrative embodiment 31, further comprising:

a means for determining a loss between output DVF data of the machine learning process and expected DVF data; and a means for determining the machine learning process is validated when the loss is beyond a threshold.

Illustrative Embodiment 33: The system of any of illustrative embodiments 21-32, wherein the modality measurement data is computed tomography (CT) measurement data.

The apparatuses and processes are not limited to the specific embodiments described herein. In addition, components of each apparatus and each process can be practiced independent and separate from other components and processes described herein.

The previous description of embodiments is provided to enable any person skilled in the art to practice the disclosure. The various modifications to these embodiments will be readily apparent to those skilled in the art, and the generic principles defined herein can be applied to other embodiments without the use of inventive faculty. The present disclosure is not intended to be limited to the embodiments shown herein, but is to be accorded the widest scope consistent with the principles and novel features disclosed herein.

What is claimed is:

1. A computer-implemented method comprising:
generating displacement vector field (DVF) data based on applying a trained machine learning process to positron emission tomography (PET) measurement data and modality measurement data, wherein the DVF data characterizes offsets between the PET measurement data and the modality measurement data;
reconstructing a modality image based on the modality measurement data;
adjusting the modality image based on the DVF data;
reconstructing a PET image based on the PET measurement data and the adjusted modality image;
adjusting the PET image based on the DVF data; and
providing the adjusted PET image for display.

2. The computer-implemented method of claim 1, further comprising:
determining an inverse of the DVF data; and
adjusting the PET image based on the inverse of the DVF data.

3. The computer-implemented method of claim 1, further comprising:
generating an attenuation map based on the adjusted modality image; and
reconstructing the PET image based on the attenuation map.

4. The computer-implemented method of claim 1, wherein adjusting the modality image based on the DVF data comprises resampling the modality image based on the DVF data.

5. The computer-implemented method of claim 1, further comprising:
inputting the PET measurement data to a first convolutional neural network (CNN) of the trained machine learning process to generate first feature data;
inputting the modality measurement data to a second CNN of the trained machine learning process to generate second feature data; and
inputting the first feature data and the second feature data to a third CNN of the trained machine learning process to generate the DVF data.

6. The computer-implemented method of claim 1, further comprising:
inputting the PET measurement data to a first convolutional neural network (CNN) of the trained machine learning process to generate first feature data;
inputting the modality measurement data to the first CNN of the trained machine learning process to generate second feature data; and
inputting the first feature data and the second feature data to a second CNN of the trained machine learning process to generate the DVF data.

7. The computer-implemented method of claim 6, wherein the DVF data characterizes offsets between corresponding features of the first feature data and the second feature data.

8. The computer-implemented method of claim 1, wherein the DVF data comprises a 3-dimensional vector for each of a plurality of pixels of the modality image, the 3-dimensional vectors characterizing motion between the modality image and the PET image.

9. The computer-implemented method of claim 1, further comprising receiving the PET measurement data and the modality measurement data from an image scanning system.

10. The computer-implemented method of claim 1, further comprising providing the modality image superimposed with the adjusted PET image for display.

11. The computer-implemented method of claim 1, further comprising:
training the machine learning process based on a first PET dataset and a first modality data set; and
validating the machine learning process based on a second PET dataset and a second modality dataset.

12. The computer-implemented method of claim 11, further comprising:
determining a loss between output DVF data of the machine learning process and expected DVF data; and
determining the machine learning process is validated when the loss is beyond a threshold.

13. The computer-implemented method of claim 1, wherein the modality measurement data is computed tomography (CT) measurement data.

14. A non-transitory, computer readable medium storing instructions that, when executed by at least one processor, cause the at least one processor to perform operations comprising:
generating displacement vector field (DVF) data based on applying a trained machine learning process to positron emission tomography (PET) measurement data and modality measurement data, wherein the DVF data characterizes offsets between the PET measurement data and the modality measurement data;
reconstructing a modality image based on the modality measurement data;
adjusting the modality image based on the DVF data;
reconstructing a PET image based on the PET measurement data and the adjusted modality image;
adjusting the PET image based on the DVF data; and
providing the adjusted PET image for display.

15. The non-transitory, computer readable medium of claim 14 storing instructions that, when executed by the at least one processor, further cause the at least one processor to perform operations comprising:
determining an inverse of the DVF data; and
adjusting the PET image based on the inverse of the DVF data.

16. The non-transitory, computer readable medium of claim 14 storing instructions that, when executed by the at least one processor, further cause the at least one processor to perform operations comprising:
generating an attenuation map based on the adjusted modality image; and
reconstructing the PET image based on the attenuation map.

17. The non-transitory computer readable medium of claim 14 storing instructions that, when executed by the at least one processor, further cause the at least one processor to perform operations comprising:

inputting the PET measurement data to a first convolutional neural network (CNN) of the trained machine learning process to generate first feature data;

inputting the modality measurement data to a second CNN of the trained machine learning process to generate second feature data; and inputting the first feature data and the second feature data to a third CNN of the trained machine learning process to generate the DVF data.

18. A system comprising:

a memory storing instructions; and at least one processor communicatively coupled to the memory and configured to execute the instructions to:

generating displacement vector field (DVF) data based on applying a trained machine learning process to positron emission tomography (PET) measurement data and modality measurement data, wherein the DVF data characterizes offsets between the PET measurement data and the modality measurement data;

reconstruct a modality image based on the modality measurement data;

adjust the modality image based on the DVF data;

reconstruct a PET image based on the PET measurement data and the adjusted modality image;

adjust the PET image based on the DVF data; and provide the adjusted PET image for display.

19. The system of claim 18, wherein the at least one processor is configured to execute the instructions to:

determine an inverse of the DVF data; and adjust the PET image based on the inverse of the DVF data.

20. The system of claim 18, wherein the at least one processor is configured to execute the instructions to:

generate an attenuation map based on the adjusted modality image; and reconstruct the PET image based on the attenuation map.

* * * * *